United States Patent
Delrue et al.

(10) Patent No.: US 10,292,533 B2
(45) Date of Patent: May 21, 2019

(54) COOKING METHOD FOR ELECTRICAL COOKING APPARATUS WITH STIRRING MEANS

(71) Applicant: SEB S.A., Ecully (FR)

(72) Inventors: Olivier Delrue, Selongey (FR); François Letain, Marcilly-sur-Tille (FR); Michel Petit, Dijon (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/775,549

(22) PCT Filed: Nov. 10, 2016

(86) PCT No.: PCT/FR2016/052922
§ 371 (c)(1),
(2) Date: May 11, 2018

(87) PCT Pub. No.: WO2017/081419
PCT Pub. Date: May 18, 2017

(65) Prior Publication Data
US 2018/0353010 A1    Dec. 13, 2018

(30) Foreign Application Priority Data

Nov. 12, 2015    (FR) .................................. 15 60831

(51) Int. Cl.
*A21B 1/26*    (2006.01)
*A47J 37/12*    (2006.01)
(Continued)

(52) U.S. Cl.
CPC ............. *A47J 37/1266* (2013.01); *A21B 1/26* (2013.01); *A21B 5/085* (2013.01); *A21D 8/06* (2013.01);
(Continued)

(58) Field of Classification Search
CPC ............... A47J 37/1266; A47J 37/1257; A47J 37/1271; A47J 36/165; A47J 37/0641;
(Continued)

(56) References Cited

U.S. PATENT DOCUMENTS 3,245,800 A * 4/1966 Sanders .................. A47J 27/08
426/296
4,622,231 A * 11/1986 Swartley ............. A47J 37/0623
426/438
(Continued)

FOREIGN PATENT DOCUMENTS

FR        3004630 A1 * 10/2014    ............ A47J 37/047
WO    WO 2006/000699 A2    1/2006
WO    WO 2007/088279 A1    8/2007

OTHER PUBLICATIONS

International Preliminary Report on Patentability and the Written Opinion of the International Searching Authority as issued in International Patent Application No. PCT/FR2016/052922, dated May 15, 2018.
(Continued)

*Primary Examiner* — Drew E Becker
(74) *Attorney, Agent, or Firm* — Pillsbury Winthrop Shaw Pittman LLP

(57) ABSTRACT

An apparatus for cooking food which includes a receiving container provided for receiving food, a stirring device arranged inside the receiving container, at least one main heating system and at least one ventilation motor for generating a heating airflow, the receiving container and the stirring device being designed to be imparted with a relative rotation movement.

11 Claims, 5 Drawing Sheets

(51) Int. Cl.
*A23L 5/10* (2016.01)
*A21D 8/06* (2006.01)
*A21B 5/08* (2006.01)
*A47J 27/00* (2006.01)
*A21D 13/60* (2017.01)
*A47J 36/16* (2006.01)
*A47J 37/04* (2006.01)
*A47J 37/06* (2006.01)

(52) U.S. Cl.
CPC .............. *A21D 13/60* (2017.01); *A23L 5/12* (2016.08); *A23L 5/17* (2016.08); *A47J 27/004* (2013.01); *A47J 36/165* (2013.01); *A47J 37/047* (2013.01); *A47J 37/0641* (2013.01); *A47J 37/1257* (2013.01); *A47J 37/1271* (2013.01)

(58) Field of Classification Search
CPC .............. A47J 37/047; A47J 27/004; A47J 36/32–36/36; A47J 36/38; A23L 5/10–5/12; A23L 5/17; A21B 1/24–1/28; A21B 5/08–5/085; A21D 8/06; A21D 13/60
USPC ........ 426/231–233, 523, 438, 556, 465–466, 426/496–505, 510–511; 99/325–338, 99/348, 467–480, 409
See application file for complete search history.

(56) References Cited

U.S. PATENT DOCUMENTS

| | | | | |
|---|---|---|---|---|
| 5,076,153 A * | 12/1991 | Takahashi | ............. | A21B 7/005 366/146 |
| 5,510,127 A * | 4/1996 | Wong | ............. | A21B 7/005 426/19 |
| 5,588,352 A * | 12/1996 | Harrison | ............. | A47J 37/0641 99/339 |
| 5,590,583 A * | 1/1997 | Harrison | ............. | A47J 37/0623 126/21 A |
| 5,636,622 A * | 6/1997 | Urcelay Amondarain | ............. | F24C 15/327 126/20 |
| 5,735,190 A * | 4/1998 | Sham | ............. | A21B 7/005 366/144 |
| 5,878,655 A * | 3/1999 | Chan | ............. | A21B 7/005 126/21 A |
| 5,994,672 A * | 11/1999 | Mestnik | ............. | A47J 36/38 219/400 |
| 6,079,319 A * | 6/2000 | Doria | ............. | A47J 37/047 99/331 |
| 6,080,438 A * | 6/2000 | Hyllstam | ............. | A21B 2/00 426/496 |
| 2004/0118392 A1* | 6/2004 | McFadden | ............. | A21B 1/245 126/21 A |
| 2006/0251784 A1* | 11/2006 | Sells | ............. | A23L 5/13 426/510 |
| 2007/0068919 A1* | 3/2007 | Byrd | ............. | A21B 5/03 219/401 |
| 2007/0104844 A1* | 5/2007 | Fraccon | ............. | A21B 3/04 426/496 |
| 2008/0163764 A1* | 7/2008 | Payen | ............. | A47J 37/043 99/447 |
| 2008/0206420 A1* | 8/2008 | McFadden | ............. | A21B 1/245 426/523 |
| 2008/0213447 A1* | 9/2008 | Payen | ............. | A47J 37/043 426/438 |
| 2009/0074914 A1* | 3/2009 | Dilullo | ............. | A21D 8/06 426/21 |
| 2010/0028514 A1* | 2/2010 | Goderiaux | ............. | A47J 36/165 426/438 |
| 2010/0303985 A1* | 12/2010 | De' Longhi | ............. | A47J 37/10 426/438 |
| 2011/0214574 A1* | 9/2011 | Chang | ............. | A47J 37/00 99/340 |
| 2014/0000462 A1* | 1/2014 | Payen | ............. | A47J 36/165 99/348 |
| 2014/0161946 A1* | 6/2014 | Torricelli | ............. | A21B 7/005 426/233 |
| 2014/0224132 A1* | 8/2014 | Chang | ............. | A47J 27/002 99/348 |
| 2015/0292750 A1* | 10/2015 | Delrue | ............. | A47J 37/0641 219/400 |
| 2016/0051086 A1* | 2/2016 | De' Longhi | ............. | A47J 37/06 99/447 |
| 2016/0081509 A1* | 3/2016 | Delrue | ............. | A47J 37/047 426/231 |

OTHER PUBLICATIONS

International Search Report as issued in International Patent Application No. PCT/FR2016/052922, dated Feb. 6, 2017.

* cited by examiner

COOKING METHOD FOR ELECTRICAL COOKING APPARATUS WITH STIRRING MEANS

CROSS-REFERENCE TO RELATED APPLICATIONS

This application is the U.S. National Stage of PCT/FR2016/052922, filed Nov. 10, 2016, which in turn claims priority to French patent application number 1560831 filed Nov. 12, 2015. The content of these applications are incorporated herein by reference in their entireties.

FIELD OF THE INVENTION

This invention concerns the field of cooking methods for electrical cooking appliances comprising a stirring means arranged inside a food receiving means.

BACKGROUND OF THE INVENTION

This invention concerns in particular, but not exclusively, a cooking method for electrical appliances for mixing and cooking foods with fat and comprising a stirring means arranged inside a receiving means (also called a chamber) arranged in a case housing a hot air heating device, in which the stirring means and the chamber are designed to be put into motion with respect to each other, in order to mix and stir the food and the fat inside the chamber, and in particular food in pieces, such as French fries, chicken pieces, etc. The document WO 2006/000699 discloses such cooking appliances.

The document WO 2007/088279 discloses a cooking appliance of the aforementioned type comprising a stirring paddle rotated inside a food receiving means (also called a chamber). The geometry of the stirring paddle and the movement of the stirring paddle inside the chamber help to reorient the foods, in particular French fries, in relation to each other. The different surfaces of the French fries may then successively come into contact with the bottom of the chamber expected to collect the fat, the French fries at the top of the chamber being more exposed to the hot air flow. These arrangements make it possible to obtain more uniform cooking. However, one drawback of the aforementioned construction resides in the fact that the mixing system does not permit cooking all types of foods added to the chamber, such as "soft" foods. In fact, this mixing puts mechanical stress on soft food, which cannot withstand the force applied because of the food's stability at the start of cooking. For example, types of soft foods include, but are not limited to, doughnuts.

A cooking method is known, using an appliance as mentioned above, which permits cooking foods covered in breadcrumbs. This method has several steps, including an initial step in which there is no mixing of foods, that is, in which the stirring means is deactivated. However, this method is not suitable for cooking "soft" foods, because the mixing performed in the later steps has the effect of deforming foods such as doughnuts, making them less attractive to the consumer. Moreover, in this method, soft foods have a thick crust and do not rise sufficiently.

SUMMARY OF THE INVENTION

The purpose of the invention is thus to permit cooking "soft" foods, such as doughnuts, with less fat, while preserving their geometry and allowing them to rise.

One objective of this invention concerns a cooking method for a food cooking appliance comprising a receiving means provided to receive the food, a stirring means arranged inside is the receiving means, at least one main heating means and at least one ventilation motor for generating a heating flow, the receiving means and the stirring means being designed to be imparted with a relative rotation movement, the cooking appliance comprising at least one means for control of the relative rotation movement, of the main heating means, and of the ventilation motor, characterized in that the cooking method includes:

a first cooking step of a first duration, during which the relative rotation movement of the receiving means and of the stirring means is neutralized, the main heating means is controlled in order to regulate the temperature at a first set-point value, and the ventilation motor is set to a first ventilation speed in order to regulate the heating flow at a first circulation speed;

a second cooking step of a second duration, greater than the first duration, during which the relative rotation movement of the receiving means and of the stirring means is active at a first rotation speed, the main heating means is controlled in order to regulate the temperature at a second set-point value, less than or equal to the first set-point value, and the ventilation motor is set to a second ventilation speed, lower than the first ventilation speed, in order to regulate the heating flow at a second circulation speed.

In this way, the method of cooking in two specific steps permits successful cooking of soft foods. In fact, the high-temperature cooking of the first step, coupled with the lack of mixing, permits forcing the soft food to rise because of yeast, when the food contains it. The effect of the second step on soft foods is that the low-temperature cooking permits cooking the inside without cooking the outside and permits not drying the surface of the soft foods during this same second step.

According to one embodiment, the total cooking duration of the two cooking steps corresponds to the cooking duration selected by a user.

In this way, it is sufficient to indicate a total cooking duration, and the cooking method automatically adapts this total duration to the two specific cooking durations necessary for the two cooking steps.

According to one embodiment, the duration of the first cooking step is identical regardless of the total duration of the two cooking steps and is between 3 and 6 minutes, and is preferably equal to 4 minutes.

The duration of the first cooking step is preferably fixed at 4 minutes, because with soft foods such as simple or double doughnuts (i.e., filled doughnuts), this duration is the one that yields the correct rise without thickening the soft food's outer crust. This duration is the same regardless of the quantity of soft food introduced.

The second duration is adapted to the quantity of soft food introduced. For example, four simple doughnuts are cooked in 15 minutes and four double doughnuts are cooked in 20 minutes. In both cases, the duration of the first cooking step, regardless of the quantity of soft food introduced, is preferably equal to 4 minutes.

According to one embodiment, the first temperature set-point value is between 120 and 140° C. This temperature permits making soft foods "puff up" or "rise."

According to one embodiment, the second temperature set-point value is between 110 and 120° C.

In this way, it is possible to cook the inside of soft foods without overcooking their outside.

According to one embodiment, the first ventilation speed is substantially equal to 100% of the rated ventilation speed. In this way, the speed of the heating flow is adapted to make soft foods puff up.

According to one embodiment, the second ventilation speed is between 50 and 90% of the is rated speed of the ventilation motor and is preferably situated at between 70 and 80% of the rated speed of the ventilation motor. In this way, the speed of the heating flow is adapted to cook the inside of soft foods.

Another objective of this invention concerns a food cooking appliance comprising a receiving means provided to receive the food, a stirring means arranged inside the receiving means, at least one main heating means and at least one ventilation motor for generating a heating flow, the receiving means and the stirring means being designed to be imparted with a relative rotation movement, the appliance comprising at least one means for control of the relative rotation movement, of the main heating means, and of the ventilation motor, characterized in that the control means is equipped with an electronic control unit containing a cooking program including:

a first cooking step of a first duration, during which the relative rotation movement of the receiving means and of the stirring means is neutralized, the main heating means is controlled in order to regulate the temperature at a first set-point value, and the ventilation motor is set to a first ventilation speed in order to regulate the heating flow at a first circulation speed;

a second cooking step of a second duration, greater than the first duration, during which the relative rotation movement of the receiving means and of the stirring means is active at a first rotation speed, the main heating means is controlled in order to regulate the temperature at a second set-point value, less than or equal to the first set-point value, and the ventilation motor is set to a second ventilation speed, lower than the first ventilation speed, in order to regulate the heating flow at a second circulation speed.

Such an appliance makes it possible to cook soft foods so that they hold their initial shape, puff up, have a thin crust and have coloration.

According to one embodiment, the receiving means comprises a plate provided to receive the foods and positioned over the said receiving means and the stirring means, and the plate and the receiving means are designed to be imparted with a relative rotation movement.

In this way, soft foods are not subject to the stirring means, which permits better preserving their geometry.

BRIEF DESCRIPTION OF THE DRAWINGS

The invention will be more fully understood in consideration of the embodiment examples, which are in no way restrictive, illustrated in the attached figures, in which.

DESCRIPTION OF THE PREFERRED EMBODIMENT

Figure 1:
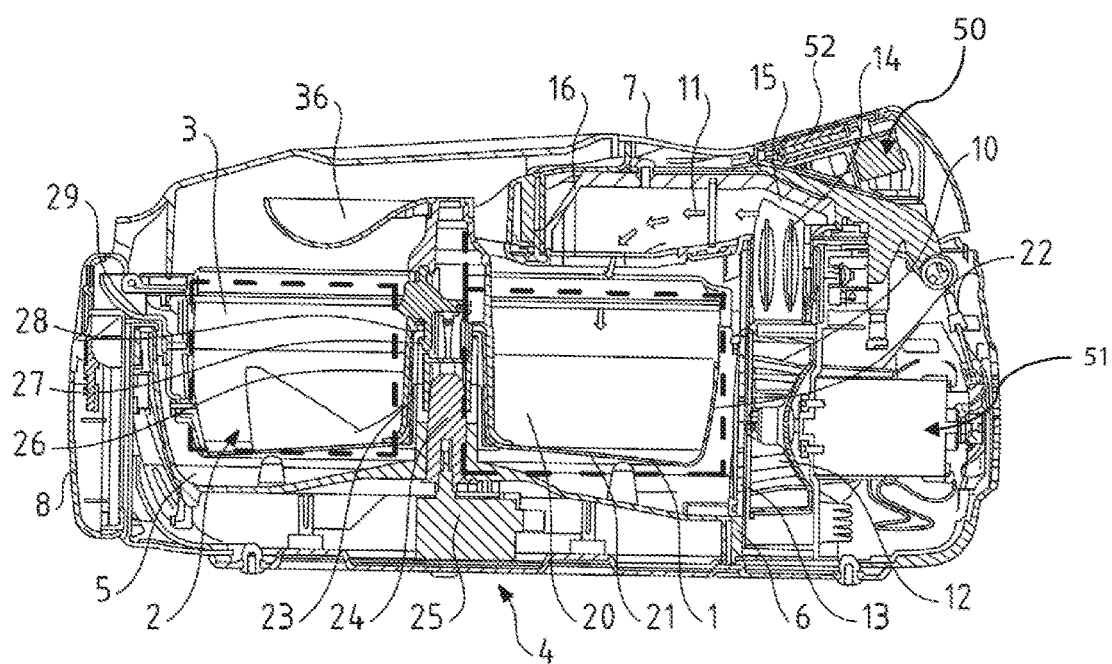
FIG. 1 is a longitudinal cross section view of an embodiment example of an appliance to implement the method according to the invention.

The cooking appliance represented in FIG. 1 comprises a receiving means 1 provided to receive the foods, a stirring means 2 arranged inside the receiving means 1. The receiving means 1 has a top opening 3. The receiving means 1 and the stirring means 2 are designed to be imparted with a relative rotation movement.

More specifically, the receiving means 1 is arranged in a case 4. The case 4 defines a housing 5 in which the receiving means 1 is arranged. The case 4 comprises a body 6 topped with a lid 7. The lid 7 has a transparent or translucent part arranged over the receiving means 1.

The cooking appliance comprises a main heating means 10. As represented in FIG. 1, the main heating means 10 generates a heating flow 11 entering the receiving means 1 through the top opening 3.

More specifically, the cooking appliance comprises a fan 12 provided to aspirate the air in the housing 5 through an air intake 13 and to propel the air over a heating element 14 arranged in a duct 15 leading to the housing 5. A portion 16 of the duct 15 is arranged in the lid 7. The fan 12 is put into motion by a ventilation motor 51.

More specifically, the receiving means 1 is formed of a chamber 20 comprising a bottom 21 and a side wall 22. The bottom 21 slopes down toward the side wall 22. The chamber 20 has a central opening 23 provided for the passage of a drive shaft 24 rotated by a motor 25. A stack 26 is mounted over the central opening 23. The stirring means 2 is mounted over the drive shaft 24. The stirring means 2 has a hooking member 27 provided to engage with a holding member 28 arranged inside the stack 26. The chamber 20 is advantageously made of metallic material, preferably coated metallic material or stainless steel. The receiving means 1 comprises a support 29 fixed to the chamber 20. The receiving means 1 has a handle 8. The handle 8 is, for example, mounted articulated on the support 29.

Figure 2:
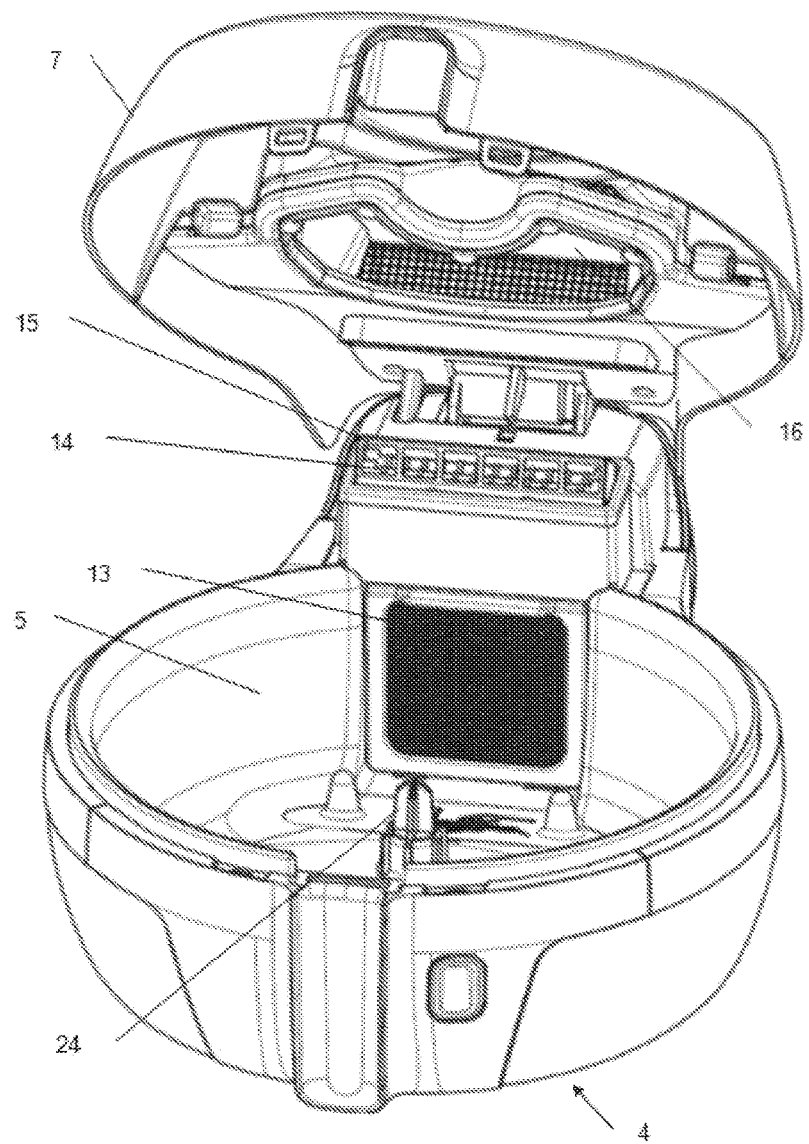
FIG. 2 is a perspective view in the open position of the appliance represented in FIG. 1, from which the receiving means has been removed.

The receiving means 1 is mounted detachably with respect to the case 4, FIG. 2 illustrating the case 4 with the lid 7 open in the absence of the receiving means 1.

Figure 3:
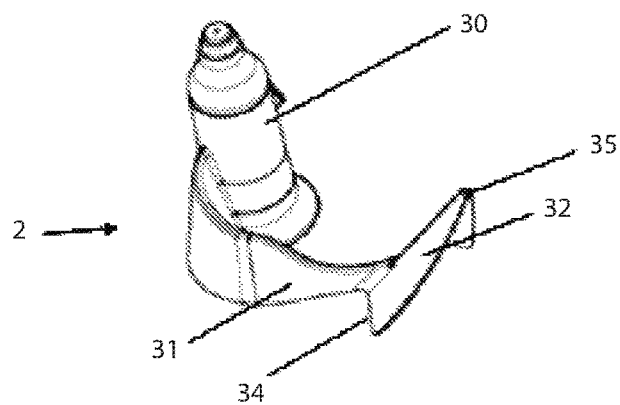
FIG. 3 is a perspective view of the stirring means provided to be arranged inside the receiving means.

The stirring means 2 illustrated in FIG. 3 comprises a hub 30 provided to groom the stack 26, and an arm 31 coming out of the hub 30. The stirring means 2 comprises a means 32 for raising foods formed by a receding surface inclined in relation to the axis of the hub 30. The width of the receding surface reduces from a lower front portion 34 toward a higher rear portion 35. A spoon 36 is mounted detachably on the upper end of the hub 30.

Figure 4:
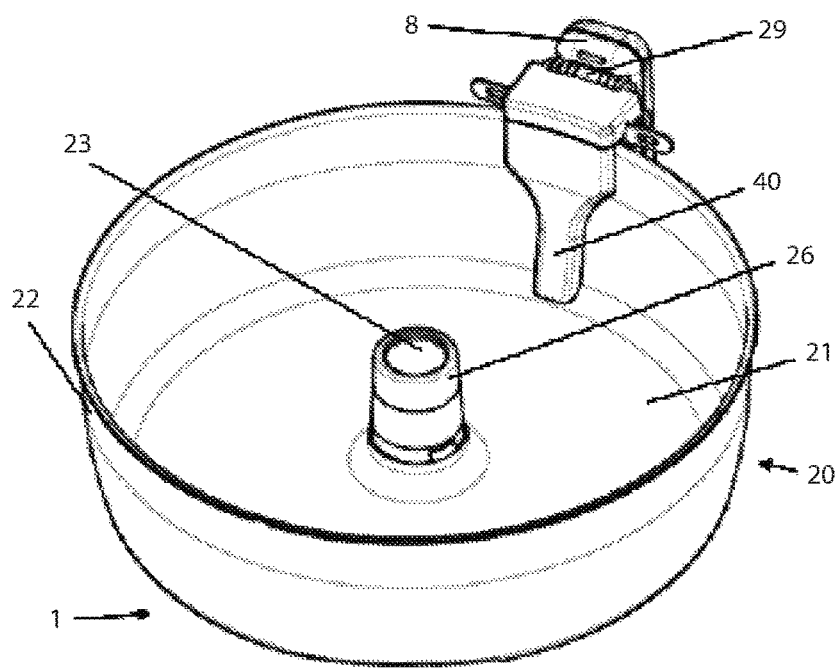
FIG. 4 is a perspective view of the receiving means.

As visible in FIG. 4, a side obstacle 40 is positioned in the receiving means 1. More specifically, the side obstacle 40 comes out of the support 29. The side obstacle 40 extends over at least a portion of the height of the side wall 22 of the chamber 20.

According to the invention, the stirring means 2 is rotated by a motor 25 that is mechanically connected to the drive shaft 24. The motor 25 is controlled by a control means 50. In general, the control means 50 ensures the activation or neutralization of the motor 25 and thus the rotation of the stirring means 2. Likewise, the control means 50 ensures power to the main heating means 10 of the appliance and power to the ventilation motor 51. In particular, the control means 50 is conformed to ensure the functioning of the appliance according to at least two temperature levels and at least one ventilation speed.

According to a variant, the appliance also comprises a plate 60 which is positioned in the case 4 over the receiving means 1 and the stirring means 2 arranged inside the receiving means 1.

The appliance also comprises an electronic control unit 52 in which cooking programs may be saved.

The appliance also comprises in a manner known per se a user interface permitting the user in particular to turn on the appliance, and to choose, modify or cancel a cooking mode preprogrammed in the electronic control unit 52.

According to the invention, the electronic control unit 52 permits implementing a particular cooking method to permit preserving the quality of soft foods. The implementation of the method permits in particular the cooking of soft foods, such as doughnuts, with less fat, while preserving their geometry and allowing them to rise.

The cooking method includes for this two main steps. A first cooking step (E1) of a first duration (T1), which consists of neutralizing the relative rotation movement of the receiving means 1 and of the stirring means 2, controlling the main heating means 10 in order to regulate the temperature at a first set-point value, and setting the ventilation motor 51 to a first ventilation speed in order to regulate the heating flow 11 at a first circulation speed.

According to the first step, the non-rotation of the stirring means 2 permits preserving the geometry of soft foods, which are fragile at the beginning of cooking. The temperature chosen during this first step permits the foods to begin cooking, and thus permits solidification. After this first step, the soft foods have gained the mechanical strength to withstand the stirring performed in the second step.

In fact, the second step of the method consists of activating the relative rotation movement of the receiving means 1 and of the stirring means 2 according to a first rotation speed, the main heating means 10 is controlled in order to regulate the temperature at a second set-point value, less than or equal to the first set-point value, and the ventilation motor 51 is set to a second ventilation speed, lower than the first ventilation speed, in order to regulate the heating flow 11 according to a second circulation speed. This second cooking step (E2) is of a second duration (T2), greater than the first duration (T1).

According to the second step (E2), the circulation speed of the heating flow 11 is lower compared to the first step so as not to dry the surface of the soft foods.

According to one embodiment, the first set-point value of the first step is between 120° and 140° C. and the second set-point value of the second step is between 110 and 120° C.

The exact choice of temperature depends in particular on the type of soft foods to be cooked.

According to another characteristic of the method according to the invention, the total cooking duration of the two cooking steps (T1, T2) corresponds to the cooking duration selected by a user.

To better understand the method according to the invention, the functioning and use of the appliance are described in detail below.

The user places the receiving means 1 in the housing 5 of the case 4, mounts the stirring means 2 in the receiving means 1, places the soft foods in the receiving means 1 and, if desired, adds fat or oil using the spoon 36.

When the appliance is turned on, the user selects the appropriate cooking mode and chooses the cooking time via the user interface. According to another variant, a predetermined duration may be displayed and then modified by the user.

When the user starts the selected cooking cycle of the appliance, the first step of the method according to the invention is triggered by the electronic control unit 52. Thus, the heating means 10 generates the heating flow 11 entering the receiving means 1 through the top opening 3, and the motor 25, rotating the stirring means 2 in the receiving means 1, is not activated. Temperature control according to the first temperature value is ensured, for example, via a negative temperature coefficient (NTC) sensor. When the duration of the first step has elapsed, the second step of the method according to the invention begins.

The heating means is kept active, but the control temperature is modified and reduced to a second value. The motor 25 rotating the stirring means 2 in the receiving means 1 is incidentally activated.

The stirring means 2 helps displace the foods in relation to each other.

In particular, the side obstacle 40 blocks a portion of the foods arranged in the periphery and promotes the lifting of the foods under the effect of the means 32 for raising foods.

The user may remove the receiving means 1 from the case 4 using a handle 8.

Figure 6:
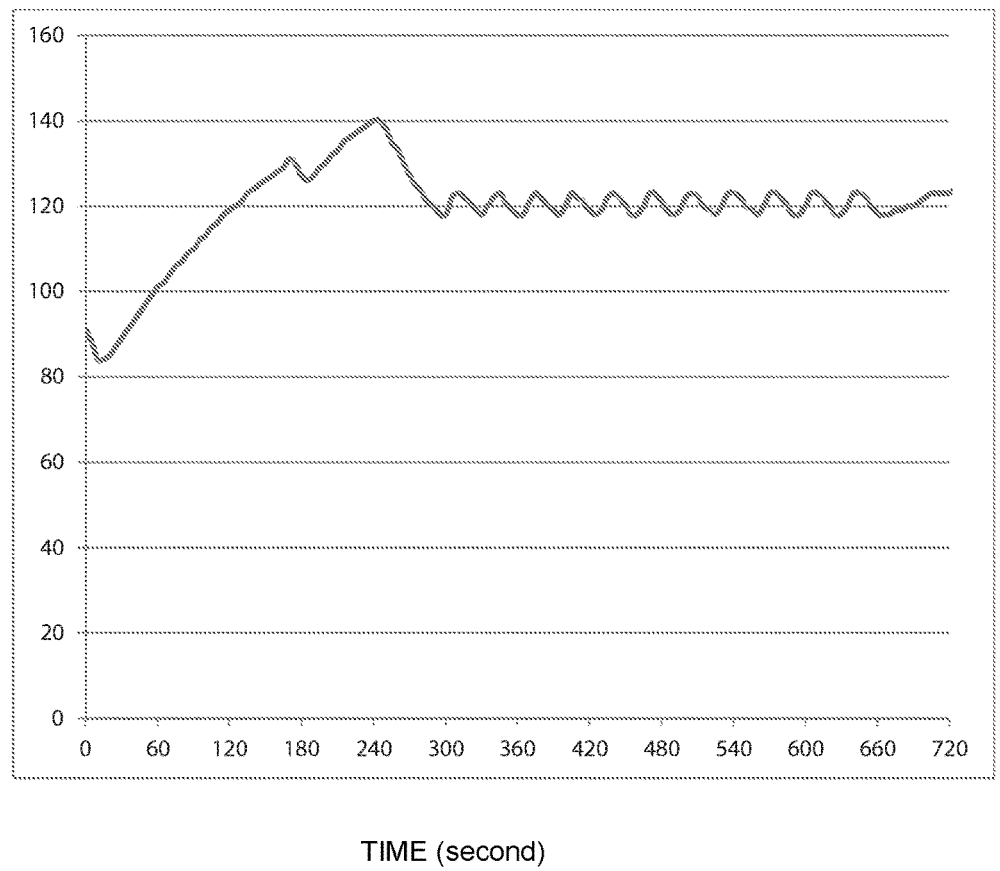
FIG. 6 is a diagram of the temperature evolution over time for the method according to the invention.

As visible in FIG. 6 which represents the temperature variation in the appliance as a function of time, the two steps are visible and the temperature drop occurs substantially at the end of the first step and is situated at approximately 4 minutes.

Figure 5:
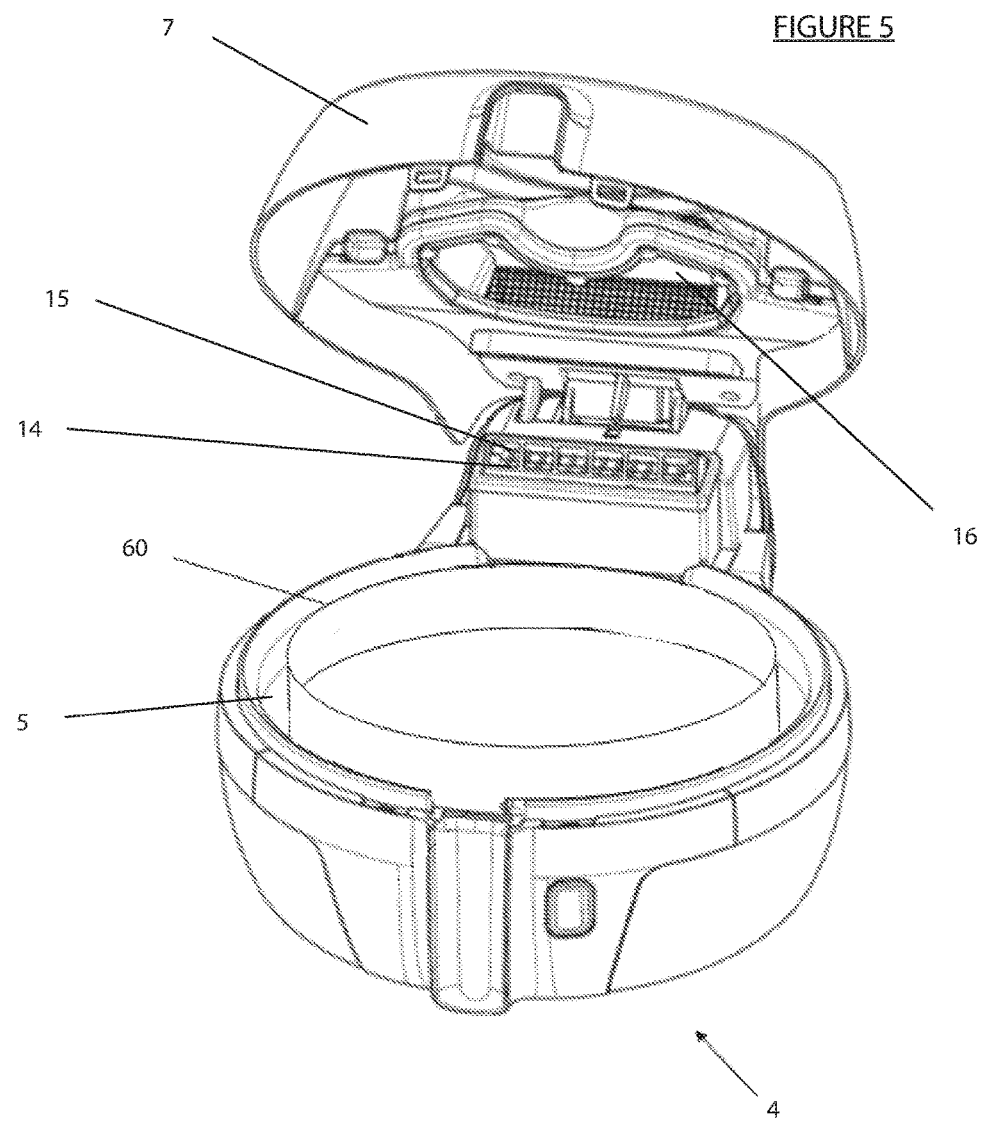
FIG. 5 is a perspective view in the open position of the appliance represented in FIG. 1, in a variant in which a plate has been integrated over the receiving means.

As a variant visible in FIG. 5, a plate 60 is positioned over the stirring means 2 and the receiving means 1 so as to prevent soft foods from being mixed by the stirring means 2. However, the plate 60 is mobile in relation to the receiving means 1 and the two steps of the method may also be performed.

As a variant, other types of heating means 10 may be envisioned, in particular a radiant heating means generating a radiating heating flow 11 entering the receiving means 1 through the top opening 3, or a heating means arranged in or below the receiving means 1. If desired, the heating means may be integral with the receiving means 1.

As a variant, the stirring means 2 is not necessarily rotated in the receiving means 1. In particular, the receiving means may be rotated, if desired inside a case.

As a variant, the receiving means 1 is not necessarily formed of a chamber. The receiving means 1 preferably has a bottom and a side wall. The receiving means may in particular be formed of a perforated basket.

This invention is in no way limited to the embodiment example described and its variants, but encompasses many modifications in the context of the claims.

The invention claimed is:

1. A cooking method for a food cooking appliance comprising a receiving container provided to receive the food, a stirring device arranged inside the receiving container, at least one main heating system and at least one ventilation motor for generating a heating flow, the receiving container and the stirring device being designed to be imparted with a relative rotation movement, the cooking appliance comprising at least one controller configured to control the relative rotation movement, the main heating system, and the ventilation motor, the cooking method comprising:

a first cooking step of a first duration, during which the relative rotation movement of the receiving container and of the stirring device is neutralized, the main heating system is controlled in order to regulate the temperature at a first set-point value, and the ventilation motor is set to a first ventilation speed in order to regulate the heating flow at a first circulation speed; and a second cooking step of a second duration, greater than the first duration, during which the relative rotation movement of the receiving container and of the stirring device is active at a first rotation speed, the main heating system is controlled in order to regulate the temperature at a second set-point value, less than or equal to the first set-point value, and the ventilation motor is set to a second ventilation speed, lower than the first ventilation speed, in order to regulate the heating flow at a second circulation speed.

2. The cooking method according to claim 1, wherein a total cooking time of the first and second cooking steps corresponds to the cooking time selected by a user.

3. The cooking method according to claim 2, wherein the first duration of the first cooking step is identical regardless of the total duration of the first and second cooking steps and is between 3 and 6 minutes.

4. The cooking method according to claim 1, wherein the first temperature set-point value is between 120 and 140° C.

5. The cooking method according to claim 1, wherein the second temperature set-point value is between 110 and 120° C.

6. The cooking method according to claim 1, wherein the first ventilation speed is substantially equal to 100% of a rated speed of the ventilation motor.

7. The cooking method according to claim 1, wherein the second ventilation speed is between 50 and 90% of a rated speed of the ventilation motor.

8. The cooking method according to claim 3, wherein the first duration of the first cooking step is equal to 4 minutes.

9. The cooking method according to claim 7, wherein the second ventilation speed is between 70 and 80% of the rated speed of the ventilation motor.

10. A food cooking appliance comprising a receiving container provided to receive the food, a stirring device arranged inside the receiving container, at least one main heating system and at least one ventilation motor for generating a heating flow, the receiving container and the stirring device being designed to be imparted with a relative rotation movement, the appliance comprising at least one controller configured to control the relative rotation movement, the main heating system, and the ventilation motor, wherein the controller is equipped with an electronic control unit containing a cooking program for performing:

a first cooking step of a first duration, during which the relative rotation movement of the receiving container and of the stirring device is neutralized, the main heating system is controlled in order to regulate the temperature at a first set-point value, and the ventilation motor is set to a first ventilation speed in order to regulate the heating flow at a first circulation speed;

a second cooking step of a second duration, greater than the first duration, during which the relative rotation movement of the receiving container and of the stirring device is active at a first rotation speed, the main heating system is controlled in order to regulate the temperature at a second set-point value, less than or equal to the first set-point value, and the ventilation motor is set to a second ventilation speed, lower than the first ventilation speed, in order to regulate the heating flow at a second circulation speed.

11. The food cooking appliance according to claim 10, further comprising a plate provided to receive the food and positioned over the receiving container and the stirring device, and the plate and the receiving container are designed to be imparted with a relative rotation movement.

* * * * *